United States Patent
Ishii

(10) Patent No.: US 7,630,623 B2
(45) Date of Patent: Dec. 8, 2009

(54) OPTICAL APPARATUS, IMAGING APPARATUS, AND CONTROL METHOD

(75) Inventor: Kazunori Ishii, Yokohama (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 362 days.

(21) Appl. No.: 11/782,444

(22) Filed: Jul. 24, 2007

(65) Prior Publication Data

US 2008/0025715 A1 Jan. 31, 2008

(30) Foreign Application Priority Data

Jul. 28, 2006 (JP) ............................ 2006-205673

(51) Int. Cl.
G03B 13/36 (2006.01)
G03B 13/30 (2006.01)
G03B 17/18 (2006.01)

(52) U.S. Cl. .................. 396/135; 396/147; 348/346

(58) Field of Classification Search ................ 396/105, 396/135, 147; 348/346
See application file for complete search history.

(56) References Cited

U.S. PATENT DOCUMENTS

| 5,689,741 | A | * | 11/1997 | Hozumi et al. | ............. | 396/130 |
| 6,750,914 | B2 | * | 6/2004 | Sannoh et al. | ............. | 348/346 |
| 2003/0189662 | A1 | * | 10/2003 | Matsuda | ..................... | 348/345 |
| 2004/0057712 | A1 | * | 3/2004 | Sato et al. | ..................... | 396/89 |
| 2006/0008265 | A1 | * | 1/2006 | Ito | ............................ | 396/125 |
| 2006/0029381 | A1 | * | 2/2006 | Onozawa | .................... | 396/147 |
| 2006/0055814 | A1 | * | 3/2006 | Okawa et al. | ............... | 348/346 |

FOREIGN PATENT DOCUMENTS

| JP | 6-205258 A | 7/1994 |
| JP | 2002-311328 A | 10/2002 |
| JP | 2004-333828 A | 11/2004 |

* cited by examiner

Primary Examiner—W. B. Perkey
Assistant Examiner—Dennis Hancock
(74) Attorney, Agent, or Firm—Canon U.S.A., Inc. I.P. Division

(57) ABSTRACT

An optical apparatus includes a control unit configured to perform an operation for moving a focusing lens at a first speed to detect a first position corresponding to an in-focus state and then moving the focusing lens at a second speed lower than the first speed in forward and backward directions across the first position to detect a second position corresponding to an in-focus state, and an output unit configured to output information indicating an in-focus state of the focusing lens recognizable by a user. The output unit outputs the information in response to the control unit detecting the first position.

11 Claims, 8 Drawing Sheets

OPTICAL APPARATUS, IMAGING APPARATUS, AND CONTROL METHOD

BACKGROUND OF THE INVENTION

1. Field of the Invention

The present invention relates to an optical apparatus configured to perform an automatic focusing (AF) operation, an imaging apparatus including the optical apparatus, and a method for controlling the optical apparatus or the imaging apparatus.

2. Description of the Related Art

There are conventional optical systems which can generate a sound or visual output indicating an in-focus determination result when a user presses a shutter button in a still image shooting mode.

For example, as discussed in Japanese Patent Application Laid-Open No. 6-205258, an in-focus position detection apparatus enables a user to confirm an in-focus position displayed on a screen of a viewfinder. This apparatus determines a specific block corresponding to an in-focus position based on a comparison of high-frequency components in respective blocks between the image signals of two successive pictures. Then, the apparatus blinks the identified in-focus block on the screen of the viewfinder.

Furthermore, as discussed in Japanese Patent Application Laid-Open No. 2004-333828, there is an imaging apparatus including an indicator that notifies a user about the degree of an in-focus state. This apparatus quantitatively calculates a focusing degree of each image received via an image-pickup lens and generates a sound or visual output indicating the detected focusing degree.

Moreover, as another conventional technique, a hybrid AF system including a TV-AF system and another focus detection system (e.g., a phase-difference AF system) can speedily and accurately perform a focusing operation.

A focus adjustment based on the TV-AF system includes processes of obtaining a video signal from an image sensor that applies a photoelectric conversion to an object image, extracting a high-frequency component (i.e., an AF evaluation value) from the video signal obtained by the image sensor via a band-pass filter, and searching for a position where the AF evaluation value can be maximized while a focusing lens is moved.

On the other hand, a focus adjustment based on the phase-difference AF system includes processes of splitting incident light from an object into two focus detection sensors which are separately provided, detecting a deviation of output images of the sensors, and calculating an object distance based on the detected deviation according to the principle of triangulation.

According to the above-described hybrid AF system, a detection object area (e.g., a range-finding area or in-focus detection area) of one AF system tends to be different from a detection object area of the other AF system.

Hence, as discussed in Japanese Patent Application Laid-Open No. 2002-311328, an electronic camera can be configured to notify a user about a detection object area and an in-focus determination result when a user presses a shutter button, so that the user can easily focus the electronic camera on a desired object.

However, according to the focus adjustment based on the conventional TV-AF system, the moving direction of the focusing lens is repeatedly reversed to search for a target position where the AF evaluation value can be maximized. The apparatus cannot determine that the focusing lens has reached an in-focus state before the focusing lens comes to repeatedly continue reversing motions. Therefore, a relatively long time is required until a user is notified about an in-focus state of the focusing lens. The user may feel a sense of discomfort.

In particular, the above-described hybrid AF system discussed in Japanese Patent Application Laid-Open No. 2002-311328 first performs a rough focusing control based on the phase-difference AF system and then performs a precise focusing control based on the TV-AF system to finally move the focusing lens to a target (i.e., in-focus) position. In other words, it takes a long time to finally determine an in-focus state of the focusing lens, and the notification to a user is significantly delayed.

SUMMARY OF THE INVENTION

Exemplary embodiments, features and aspects of the present invention are directed to an optical apparatus having a function of notifying a user about an in-focus state.

According to an aspect of the present invention, an optical apparatus includes a control unit configured to perform an operation for moving a focusing lens at a first speed to detect a first position corresponding to an in-focus state and then moving the focusing lens at a second speed lower than the first speed in forward and backward directions across the first position to detect a second position corresponding to an in-focus state; and an output unit configured to output information indicating an in-focus state of the focusing lens recognizable by a user, wherein the output unit outputs the information in response to the control unit detecting the first position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, and features of the invention and, together with the description, serve to explain at least some of the principles of the invention.

DETAILED DESCRIPTION OF THE EMBODIMENTS

Figure 1:
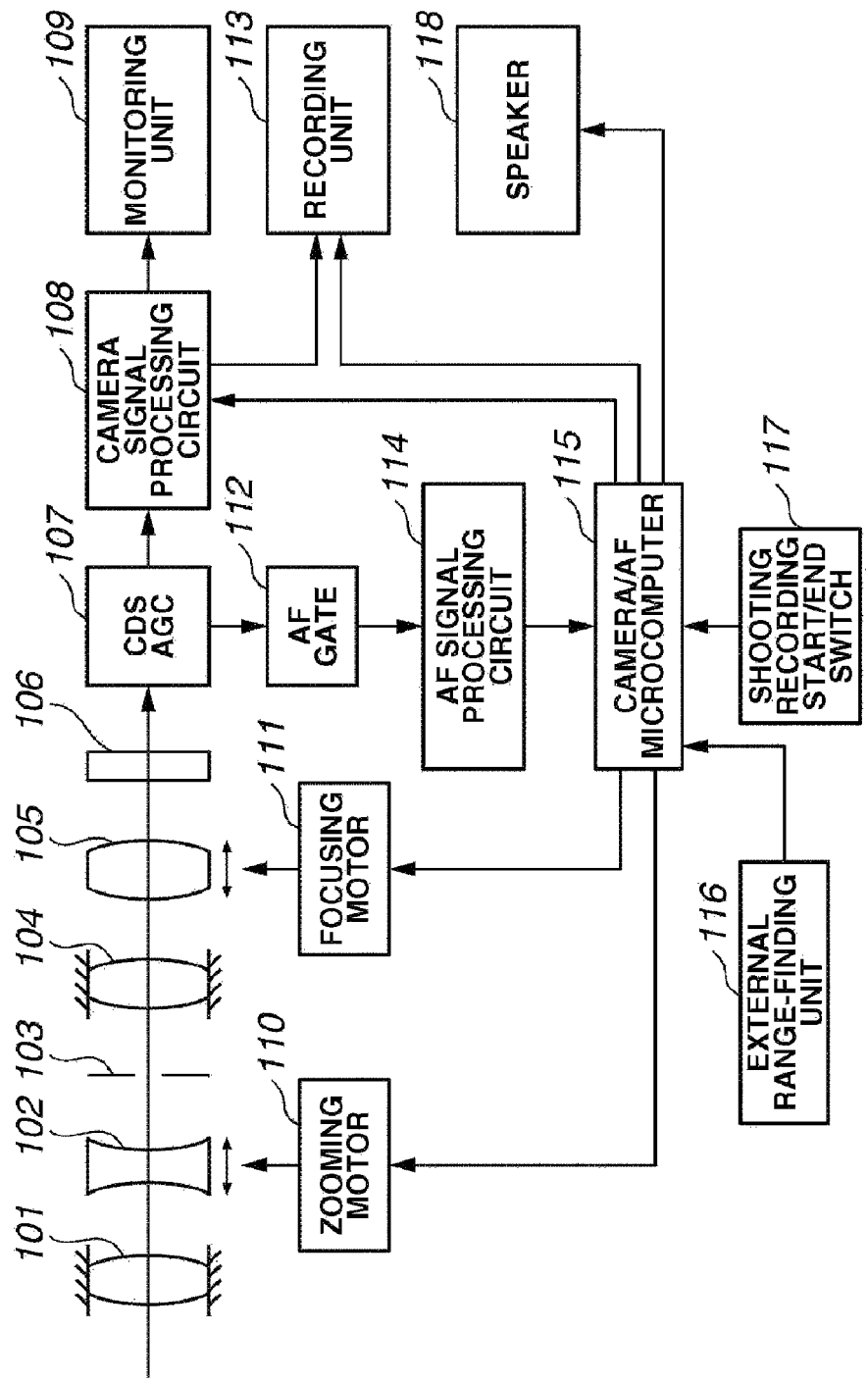
FIG. 1 is a block diagram illustrating an example video camera according to a first exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is described in one figure, it may not be discussed for following figures.

Various exemplary embodiments, features and aspects of the present invention will now herein be described in detail below with reference to the drawings.

First Exemplary Embodiment

FIG. 1 illustrates a video camera (an imaging apparatus) according to a first exemplary embodiment of the present invention. The video camera according to the present exemplary embodiment is integrated with a photographic lens. The present exemplary embodiment is also applicable to a video camera to which a photographic lens can be attached and detached. In this case, a control signal generated by a later-described camera/AF microcomputer is transmitted to a built-in microcomputer of the photographic lens, so that the camera/AF microcomputer can control a moving operation of a focusing lens unit via the lens microcomputer. Furthermore, application of the present invention is not limited to a video camera. The present exemplary embodiment and a later-described second or third exemplary embodiment can be applied to various imaging apparatuses including a digital still camera.

The video camera illustrated in FIG. 1 includes a first stationary lens unit 101, a zooming lens 102, an iris 103, a second stationary lens unit 104, a focusing lens 105, an image sensor 106, a correlated double sampling/auto gain control (CDS/AGC) circuit 107, a camera signal processing circuit 108, a monitoring unit 109, a zooming motor 110, a focusing motor 111, an AF gate 112, a recording unit 113, an AF signal processing circuit 114, a camera/AF microcomputer 115, an external range-finding unit 116, a shooting recording start/end switch 117, and a speaker (i.e., a sound output unit) 118.

The zooming lens 102 is a lens unit capable of performing a variable power control. The focusing lens 105 is a lens unit capable of performing a focus adjustment and compensating for the movement of an image plane caused by the variable power. In FIG. 1, each lens unit can include a single lens or a plurality of lenses. The optical system illustrated in FIG. 1 can be referred to as an imaging optical system.

The zooming motor (i.e., a zooming drive source) 110 can move the zooming lens 102 in a direction parallel to the optical axis (i.e., right and left direction in FIG. 1). Similarly, the focusing motor (i.e., a focusing drive source) 111 can move the focusing lens 105 in the direction parallel to the optical axis.

Incident light from an object (i.e., object light) passes through the above-described lens units and the iris (101 through 105) and forms an image on the image sensor 106. The image sensor 106 is a photoelectric conversion element, such as a charge-coupled device (CCD) or a complementary metal-oxide semiconductor sensor (CMOS), which can convert an object image formed on an imaging plane into an electric signal. The electric signal of the image sensor 106 is sampled and gain-adjusted by the CDS/AGC circuit 107 and is input to the camera signal processing circuit 108.

The camera signal processing circuit 108 applies predetermined processing to the signal received from the CDS/AGC circuit 107 and generates a video signal (image) suitable for recording on the recording unit (recording apparatus) 113 and displaying on the monitoring unit (monitoring apparatus) 109.

When a user presses a shooting recording start/end switch 117, the recording unit 113 can record an input video signal on a recording medium (e.g., a magnetic tape, an optical disk, or a semiconductor memory). When a user again presses the shooting recording start/end switch 117, the recording unit 113 stops a recording operation for the video signal. The monitoring unit 109 displays an object video on an electronic viewfinder or on a liquid crystal panel based on the input video signal.

The AF gate 112 receives an output (i.e., a full-screen video signal) from the CDS/AGC circuit 107 and selects a signal of a predetermined screen area which is used for a focusing control. In the present exemplary embodiment, the screen area used for the focusing control has an arbitrary size and can be divided into a plurality of areas.

The AF signal processing circuit 114 receives an output of the AF gate 112 and extracts an AF evaluation value (i.e., a signal indicating an in-focus state), such as a high-frequency component used in the focusing control based on the TV-AF system or a luminance difference component (i.e., a difference between a maximum luminance level and a minimum luminance level in the video signal) which is generated from the high-frequency signal.

The AF signal processing circuit 114 outputs the AF evaluation value to the camera/AF microcomputer 115. The AF evaluation value represents the sharpness of a video signal obtained by the image sensor 106. The sharpness varies depending on a focusing state (in-focus state) of the imaging optical system. As a result, the AF evaluation value can be used as information indicating a focusing state of the imaging optical system.

The camera/AF microcomputer 115 searches for an in-focus position of the focusing lens 105 where the AF evaluation value has a maximum level (a maximum value or a neighboring value equivalent to the maximum value). The camera/AF microcomputer 115 outputs a control signal to the focusing motor 111. The focusing motor 111 successively drives the focusing lens 105 to move a predetermined distance based on the control signal. The focusing control performed in this manner is generally referred to as "TV-AF control."

The camera/AF microcomputer 115 is a microcomputer which controls the operation of the video camera. The camera/AF microcomputer 115 receives an output from the AF signal processing circuit 114 and an output from the external range-finding unit 116 and performs calculations for an AF control based on the received signals. The camera/AF microcomputer 115 outputs a control signal to the focusing motor 111 based on the calculation result. The focusing motor 111 drives the focusing lens 105 based on the control signal.

The external range-finding unit 116 is a sensor capable of measuring the distance to an object without using light having passed through the imaging optical system (i.e., photographic lens) and outputting a signal representing the measured distance. The external range-finding unit 116 includes a set of line sensors which can receive two split beams of incident light from an object. Each line sensor generates an output signal representing the quantity of received light.

The external range-finding unit 116 detects a deviation between two output signals of respective line sensors (i.e., a relative positional deviation between two split beam directions), and calculates an object distance based on the principle of triangulation.

Although the present exemplary embodiment is based on a passive range-finding system, the present exemplary embodiment can use other systems, such as an ultrasonic sensor (i.e., an active system) that can measure an object distance based on a propagation speed or a triangulation range-finding system using an infrared ray projected onto an object, which can be used in a compact camera.

The camera/AF microcomputer 115 calculates a target position (i.e., an in-focus position) of the focusing lens 105 based on object distance information detected or measured by the external range-finding unit 116 and focal length information of the imaging optical system. Then, the camera/AF microcomputer 115 causes the focusing motor 111 to move the focusing lens 105 toward the in-focus position while the camera/AF microcomputer 115 constantly obtains the AF evaluation value.

Alternatively, the camera/AF microcomputer 115 can use a table of in-focus position data prepared beforehand. In this case, the camera/AF microcomputer 115 causes the focusing motor 111 to move the focusing lens 105 toward the in-focus position based on an in-focus position read from the data table.

The reason why the camera/AF microcomputer 115 constantly obtains the AF evaluation value is that the moving direction of the focusing lens 105 changes if the AF evaluation value turns into a decreasing phase. The above-described control performed by the camera/AF microcomputer 115 can be referred to as "external range-finding AF control."

In the present exemplary embodiment, the focal length information of the imaging optical system can be obtained based on an output of a position sensor (not illustrated) that detects the position of the zooming lens 102 or based on a driving pulse count value of the zooming motor 110 which starts counting when the zooming lens 102 moves from a reference position.

Next, an exemplary hybrid AF control performed by the camera/AF microcomputer 115 is described in detail with reference to the flowchart of FIG. 2. First, the camera/AF microcomputer 115 constantly performs a TV-AF control to move the focusing lens to an in-focus position (i.e., a position where the AF evaluation value is maximized), which can be searched for during a moving operation of the focusing lens 105.

If any change in the object distance is detected based on the external range-finding AF control, the camera/AF microcomputer 115 causes the focusing motor 111 to move the focusing lens 105 toward the in-focus position calculated based on the object distance detected in the external range-finding AF control.

Furthermore, if the present focusing lens position (i.e., an operation start position) largely deviates from the in-focus position, the camera/AF microcomputer 115 causes the focusing motor 111 to move the focusing lens 105 toward the in-focus position obtained based on the external range-finding AF control.

For example, when the contrast of a captured image has changed or when a user has changed a principal object, the present focusing lens position largely deviates from the in-focus position. With such a control operation, the camera/AF microcomputer 115 can accurately and speedily accomplish the focusing control. Moreover, the camera/AF microcomputer 115 can change the moving direction of the focusing lens 105 when the AF evaluation value turns into a decreasing phase, because the camera/AF microcomputer 115 constantly obtains the AF evaluation value.

In step S201, the camera/AF microcomputer 115 starts a hybrid AF control. In step S202, the camera/AF microcomputer 115 performs a TV-AF control. The TV-AF control includes a minute driving operation (i.e., fine focus adjustment) and a hill-climbing driving operation (i.e., quick focus adjustment). In the minute driving operation, the camera/AF microcomputer 115 causes the focusing motor 111 to move the focusing lens 105 at a low speed, which is lower than a predetermined speed. Thus, the focusing lens 105 moves with a minute amount of movement at the slow speed. In the hill-climbing driving operation, the camera/AF microcomputer 115 causes the focusing motor 111 to move the focusing lens 105 at a high speed, which is higher than the predetermined speed. Thus, the focusing lens 105 moves with an amount of movement larger than that of the minute driving operation at the high speed.

In step S203, the camera/AF microcomputer 115 performs an external measuring AF control. In the external measuring AF control, the camera/AF microcomputer 115 determines whether a large difference is present between the in-focus position detected in the external range-finding AF control and the present focusing lens position. If the difference is large, the camera/AF microcomputer 115 causes the focusing motor 111 to move the focusing lens 105 toward the in-focus position detected in the external range-finding AF control at a speed higher than the predetermined speed.

For example, if the object distance has changed or if the contrast of a capture image has changed, the difference between the in-focus position detected in the external range-finding AF control and the present focusing lens position becomes large.

In step S204, the camera/AF microcomputer 115 determines whether the external range-finding AF control has been performed in the external measuring AF control of step S203. If the camera/AF microcomputer 115 determines that the focusing motor 111 is moving the focusing lens 105 toward the in-focus position detected in the external range-finding AF control (YES in step S204), the processing flow proceeds to step S205. If the camera/AF microcomputer 115 determines that the focusing motor 111 is moving the focusing lens 105 based on the TV-AF system (NO in step S204), the processing flow proceeds to step S206.

In step S205, the camera/AF microcomputer 115 determines whether the focusing lens 105 has reached the in-focus position detected based on the external range-finding AF control. If the camera/AF microcomputer 115 determines that the focusing lens 105 has reached the in-focus position (YES in step S205), the processing flow proceeds to step S208. If the focusing lens 105 has not reached the in-focus position (NO in step S205), the camera/AF microcomputer 115 causes the focusing motor 111 to continuously move the focusing lens 105.

Figure 2:
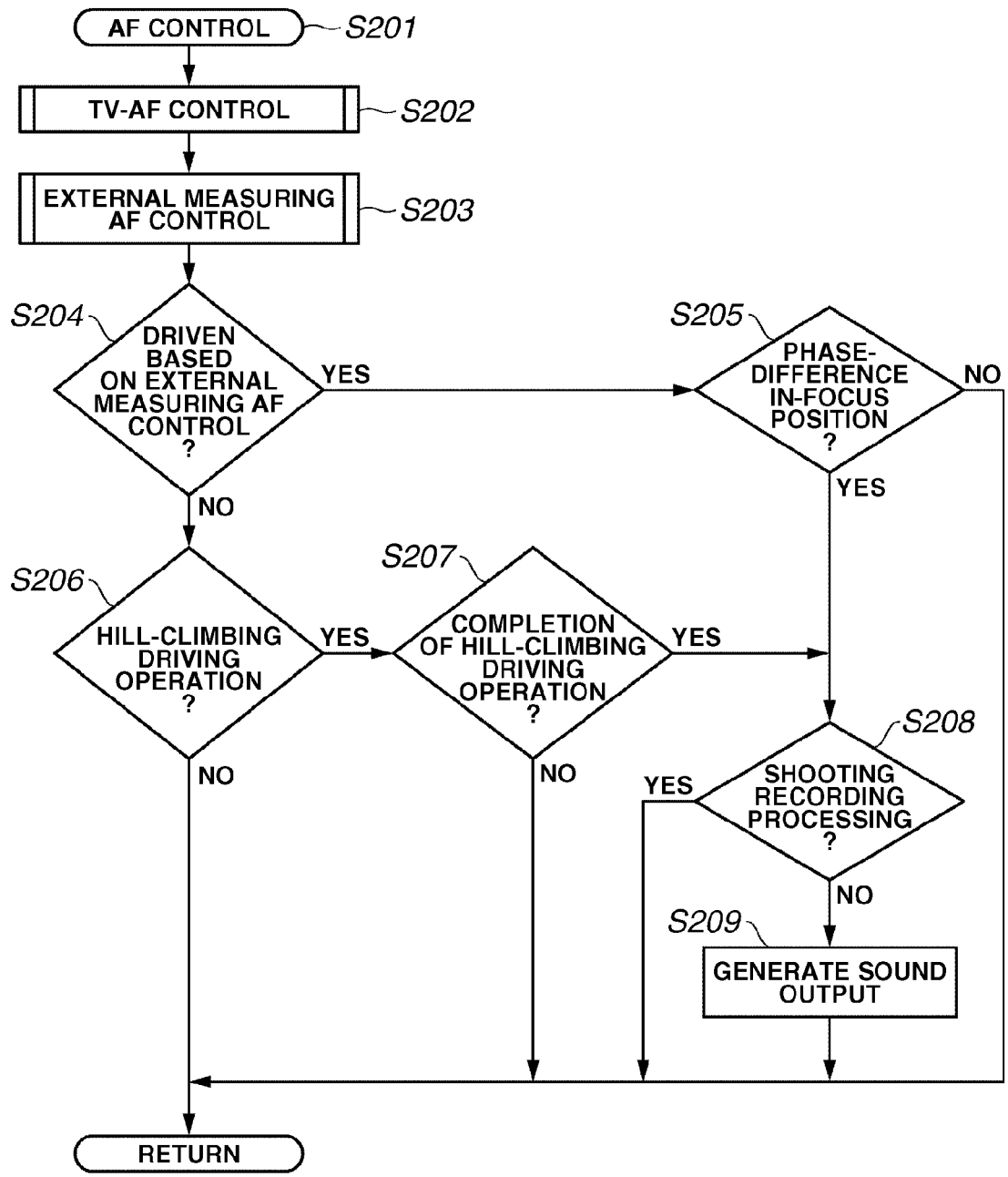
FIG. 2 is a flowchart illustrating an exemplary hybrid AF operation of the video camera according to the first exemplary embodiment.

Although not illustrated in FIG. 2, if the AF evaluation value turns into a decreasing phase during the moving operation of the focusing lens 105, the camera/AF microcomputer 115 performs processing for reversing the moving direction of the focusing lens 105 and performs the hill-climbing driving operation. Then, the processing flow proceeds to step S207. Namely, the camera/AF microcomputer 115 constantly executes the TV-AF control even when the focusing lens 105 is moving toward the in-focus position detected in the external range-finding AF control.

In step S206, the camera/AF microcomputer 115 determines whether, in the TV-AF control, the focusing control has been performed based on the hill-climbing driving operation.

If the camera/AF microcomputer 115 determines that the focusing control has been performed based on the hill-climbing driving operation (YES in step S206), the processing flow proceeds to step S207. If the focusing control has not been performed based on the hill-climbing driving operation (NO in step S206), the camera/AF microcomputer 115 continues the TV-AF operation (i.e., minute driving operation).

In step S207, the camera/AF microcomputer 115 determines whether the AF evaluation value exceeds a peak point of the AF evaluation value during the moving operation of the focusing lens 105 based on the hill-climbing driving operation and determines whether the hill-climbing driving operation has been completed.

If the camera/AF microcomputer 115 determines that the hill-climbing driving operation has been completed (YES in step S207), the processing flow proceeds to step S208. If the hill-climbing driving operation is not yet completed (NO in step S207), the camera/AF microcomputer 115 continuously searches for the peak point.

In step S208, the camera/AF microcomputer 115 determines whether the shooting recording processing is currently being performed. If the camera/AF microcomputer 115 determines that the shooting recording processing is not being performed (NO in step S208), the processing flow proceeds to step S209. In step S209, the camera/AF microcomputer 115 causes the speaker 118 to generate a sound output as information indicating an in-focus state of the focusing lens 105 recognizable by a user. Therefore, the user can know the in-focus state of the focusing lens 105 before the video camera (i.e., the camera/AF microcomputer 115) starts the minute driving operation.

In this manner, when the focusing lens 105 has been moved to the in-focus position detected based on the external range-finding AF control, or when the hill-climbing driving operation has been completed during the TV-AF control, the camera/AF microcomputer 115 notifies a user about an in-focus state of the focusing lens 105.

When the difference between an AF operation start position (or the present position) and the in-focus position obtained based on the AF operation is equal to or greater than a predetermined value, the camera/AF microcomputer 115 provides information indicating an in-focus state of the focusing lens 105 recognizable by a user. Thus, the usability of the video camera can be improved.

Furthermore, an in-focus position may not be detected based on the external range-finding AF control. A focusing control based on the external range-finding AF control may not be performed. In such cases, the video camera can perform the TV-AF control. If no in-focus state information is provided to a user when a capture image returns to an in-focus state from a greatly defocused state based on the TV-AF control, the user may feel a sense of incongruity. Accordingly, it is useful to provide in-focus state information even during execution of the TV-AF control.

As described above, the TV-AF control includes the minute driving operation and the hill-climbing driving operation. The minute driving operation is performed when the focusing lens 105 is positioned near the target (in-focus) position. The focusing lens 105 moves short distances while repeatedly reversing the moving direction in the process of determining an in-focus state of the focusing lens 105.

More specifically, to detect an in-focus position of the focusing lens 105 based on the minute driving operation, the camera/AF microcomputer 115 causes the focusing motor 111 to repeatedly move the focusing lens 105 in forward and backward directions across the position regarded as an in-focus state in the hill-climbing driving operation.

Therefore, the amount of movement of the focusing lens 105 is within the depth of focus. The captured image is almost in an in-focus state. The moving speed of the focusing lens 105 is slower than the predetermined speed. Therefore, if the information indicating an in-focus state (e.g., sound or visual output) is generated after the in-focus state is determined based on the minute driving operation, a user may feel a sense of incongruity because a relatively long time has passed.

Furthermore, the AF evaluation value may change if a slight change occurs in an object pattern. In such a case, the camera/AF microcomputer 115 causes the focusing motor 111 to repeatedly perform the processing for determining whether the focusing lens 105 has reached an in-focus position. Accordingly, even in a situation that there is no change in the object, the information indicating an in-focus state is repeatedly provided to a user. Thus, the user may feel a sense of discomfort.

On the other hand, the camera/AF microcomputer 115 starts the hill-climbing driving operation when a captured image is in a greatly defocused state and causes the focusing motor 111 to greatly move the focusing lens 105 to search for a peak point in the AF evaluation value. Namely, the amount of movement of the focusing lens 105 in the hill-climbing driving operation is greater than the amount of movement in the minute driving operation. Accordingly, the captured image clearly changes from a defocused state to an in-focus state. In such a case, a user may not feel a sense of incongruity even when the information indicating an in-focus state is provided to the user. Therefore, it is useful to notify a user about the information indicating an in-focus state at the timing a peak point is detected based on the hill-climbing driving operation.

Accordingly, when the focusing lens 105 has been moved to an in-focus position detected in the external range-finding AF control, or when a peak point is detected based on the TV-AF operation, the camera/AF microcomputer 115 causes the speaker 118 to generate information indicating an in-focus state. Thus, the present exemplary embodiment can appropriately provide focusing state information to a user.

In other words, before starting the minute driving operation, or during the minute driving operation, the present exemplary embodiment can provide the in-focus state information to a user.

Furthermore, if a sound output is generated during a shooting recording operation, the output sound may be recorded on a tape or other recording medium when picked up by a microphone or other sound input unit. If unnecessary sounds are generated during a playback operation of the tape, a user may feel a sense of discomfort. Therefore, the camera/AF microcomputer 115 prevents the speaker 118 from generating a sound output during the shooting recording operation.

The above-described sound output unit is an information output unit according to the present exemplary embodiment. However, a display output unit capable of superimposing an icon or characters on a captured image displayed on a screen of the monitoring unit 109 can also be used as the information output unit according to an exemplary embodiment. In this case, the camera/AF microcomputer 115 can cause the monitoring unit 109 to generate a visual output regardless of execution of the shooting recording operation.

Next, the TV-AF control of step S202 is described in detail with reference to the flowchart of FIG. 3. In step S301, the camera/AF microcomputer 115 starts the TV-AF control. In step S302, the camera/AF microcomputer 115 obtains the AF evaluation value detected by the AF signal processing circuit 114. In step S303, the camera/AF microcomputer 115 determines whether the operation mode is a minute driving mode.

If the camera/AF microcomputer 115 determines that the operation mode is the minute driving mode (YES in step S303), the processing flow proceeds to step S304. Otherwise (NO in step S303), the processing flow proceeds to step S311.

In step S304, the camera/AF microcomputer 115 performs the minute driving operation for determining an in-focus position or the direction of the in-focus position. Detailed processing of step S304 will be described later with reference to the flowchart of FIG. 4.

In step S305, the camera/AF microcomputer 115 determines whether the in-focus determination is successful. If the camera/AF microcomputer 115 determines that an in-focus state is detected (YES in step S305), the processing flow proceeds to step S308. In step S308, the camera/AF microcomputer 115 causes the focusing motor 111 to stop the focusing lens 105. In step S309, the camera/AF microcomputer 115 holds an AF evaluation value corresponding to the detected in-focus position. Then, in step S310, the camera/AF microcomputer 115 switches the operation mode to a restart mode.

If the camera/AF microcomputer 115 determines that no in-focus state is detected (NO in step S305), the processing flow proceeds to step S306. In step S306, the camera/AF microcomputer 115 determines whether the direction of an in-focus position has been detected based on the minute driving operation. If the camera/AF microcomputer 115 determines that the direction of the in-focus position has been detected (YES in step S306), the processing flow proceeds to step S307. In step S307, the camera/AF microcomputer 115 switches the operation mode to a hill-climbing driving mode. If the direction of the in-focus position is not detected (NO in step S306), the camera/AF microcomputer 115 continuously performs the minute driving operation for the AF control.

In step S311, the camera/AF microcomputer 115 determines whether the operation mode is the hill-climbing driving mode. If the camera/AF microcomputer 115 determines that the operation mode is the hill-climbing driving mode (YES in step S311), the processing flow proceeds to step S312. Otherwise (NO in step S311), the processing flow proceeds to step S317.

In step S312, the camera/AF microcomputer 115 performs a hill-climbing driving operation for moving the focusing lens 105 at a predetermined speed. Detailed processing of step S312 will be described later with reference to FIG. 6. In step S313, the camera/AF microcomputer 115 determines whether the AF evaluation value has exceeded a peak position during the hill-climbing driving operation. If the camera/AF microcomputer 115 determines that the AF evaluation value has exceeded the peak position (YES in step S313), the processing flow proceeds to step S314. If the AF evaluation value has not yet exceeded the peak position (NO in step S313), the camera/AF microcomputer 115 continuously performs the hill-climbing driving operation for the AF control.

In step S314, the camera/AF microcomputer 115 causes the focusing motor 111 to return the focusing lens 105 to the focusing lens position where the AF evaluation value is maximized during the hill-climbing driving operation. In step S315, the camera/AF microcomputer 115 determines whether the focusing lens 105 has returned to the focusing lens position where the AF evaluation value is maximized. If the camera/AF microcomputer 115 determines that the focusing lens 105 has returned to the focusing lens position corresponding to the peak of the AF evaluation value (YES in step S315), the processing flow proceeds to step S316.

In step S316, the camera/AF microcomputer 115 switches the operation mode to the minute driving mode. If the focusing lens 105 has not returned yet (NO in step S315), the camera/AF microcomputer 115 continuously moves the focusing lens 105 to the focusing lens position where the AF evaluation value is maximized during the hill-climbing driving operation.

In step S317, the camera/AF microcomputer 115 determines whether the operation mode is the restart mode. If the camera/AF microcomputer 115 determines that the operation mode is the restart mode (YES in step S317), the processing flow proceeds to step S318. Otherwise (NO in step S317), the processing flow proceeds to step S321.

In step S318, the camera/AF microcomputer 115 compares the AF evaluation value held in step S309 with the current AF evaluation value and determines whether a variation of the AF evaluation value is large. If the camera/AF microcomputer 115 determines that the variation of the AF evaluation value is large (YES in step S318), the processing flow proceeds to step S320. In step S320, the camera/AF microcomputer 115 switches the operation mode to the minute driving operation. If the variation of the AF evaluation value is not large (NO in step S318), the processing flow proceeds to step S319. In step S319, the camera/AF microcomputer 115 causes the focusing motor 111 to stop the focusing lens 105.

The processing flow proceeds to step S321 when the focusing lens 105 is moving toward a phase-difference in-focus position detected based on a phase-difference operation (i.e., a phase-difference driving operation in a phase-difference driving mode).

In step S321, the camera/AF microcomputer 115 determines whether the focusing lens 105 has reached the phase-difference in-focus position (target position). If the camera/AF microcomputer 115 determines that the focusing lens 105 has reached the phase-difference in-focus position (YES in step S321), the processing flow proceeds to step S322. In step S322, the camera/AF microcomputer 115 switches the operation mode to the minute driving operation. On the other hand, if the focusing lens 105 has not reached the phase-difference in-focus position (NO in step S321), the camera/AF microcomputer 115 causes the focusing motor 111 to continuously move the focusing lens 105 to the phase-difference in-focus position.

Figure 3:
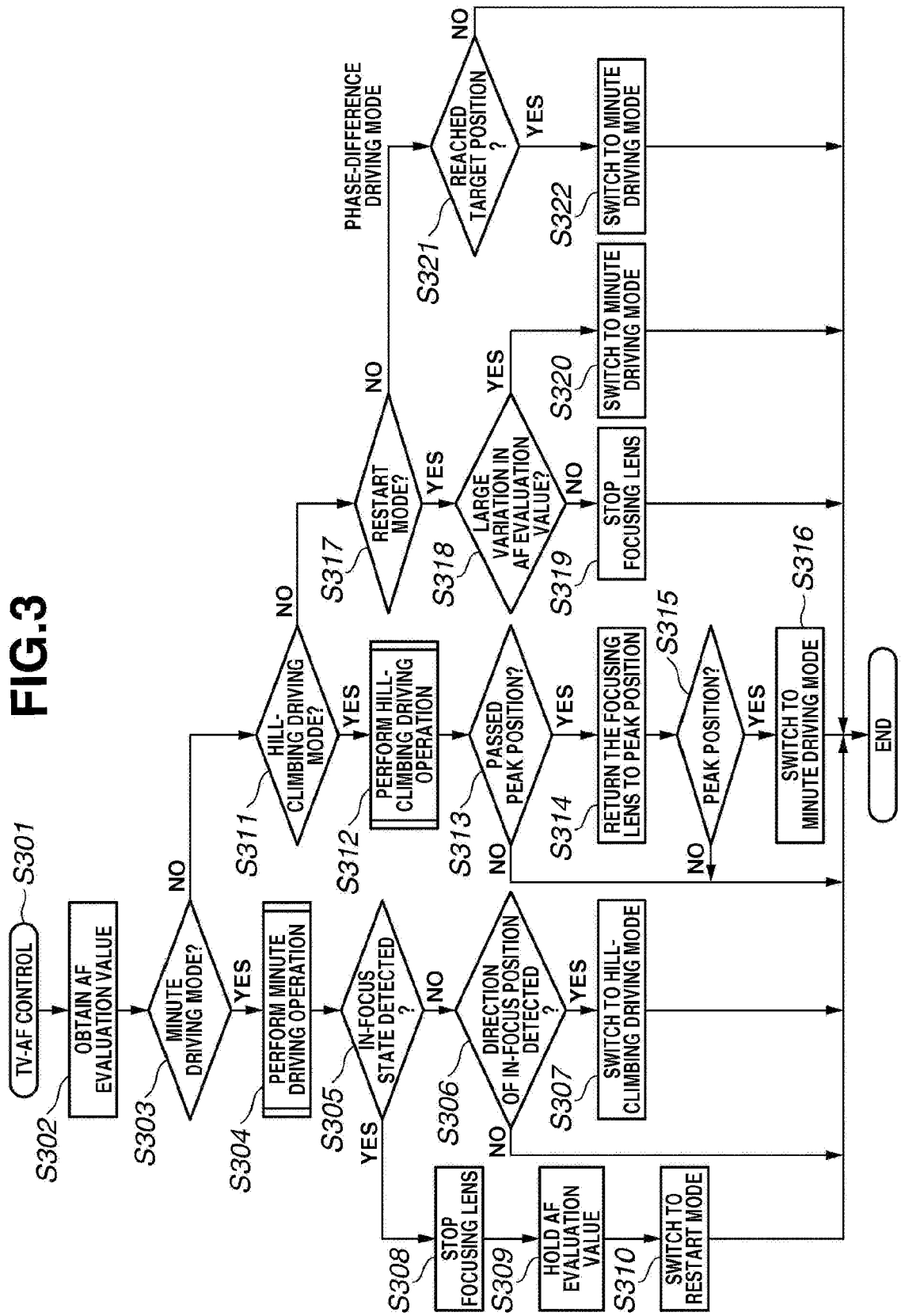
FIG. 3 is a flowchart illustrating exemplary TV-AF control of the video camera according to the first exemplary embodiment.

Although not illustrated in FIG. 3, if the AF evaluation value turns into a decreasing phase during the moving operation of the focusing lens 105, the camera/AF microcomputer 115 performs the processing for reversing the moving direction of the focusing lens 105 and performs the hill-climbing driving operation. Then, the processing flow proceeds to step S307.

Figure 4:
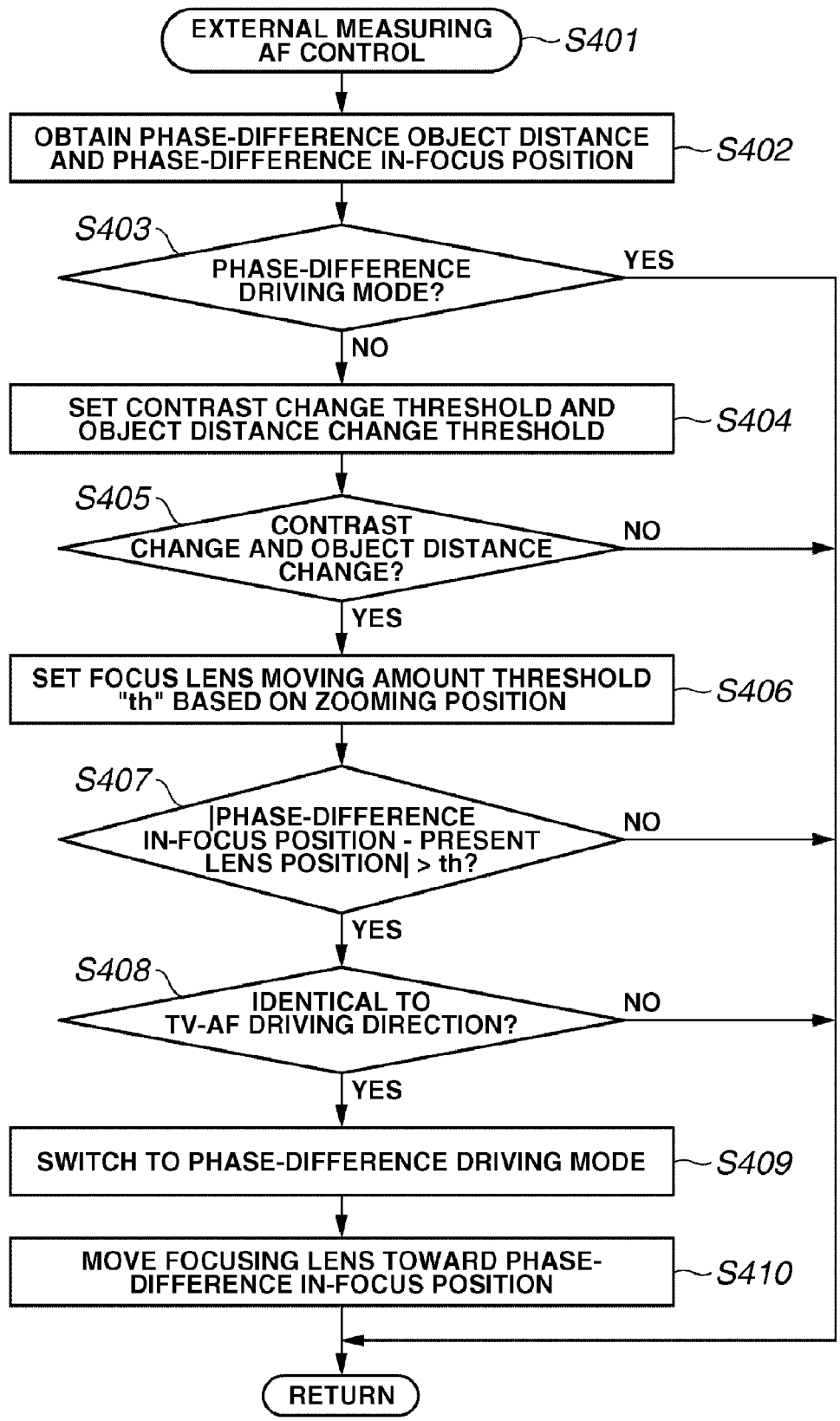
FIG. 4 is a flowchart illustrating exemplary external measuring AF control of the video camera according to the first exemplary embodiment.

Next, the external measuring AF control of step S203 is described in detail with reference to the flowchart of FIG. 4. In step S401, the camera/AF microcomputer 115 starts the external measuring AF control. In step S402, the camera/AF microcomputer 115 obtains an object distance detected by the external range-finding unit 116 and calculates a phase-difference in-focus position based on the detected object distance. In step S403, the camera/AF microcomputer 115 determines whether the focusing lens 105 is currently moving toward the phase-difference in-focus position.

If the camera/AF microcomputer 115 determines that the focusing lens 105 is currently in a phase-difference moving mode (YES in step S403), the camera/AF microcomputer 115 causes the focusing motor 111 to continuously move the focusing lens 105. If the focusing lens 105 is not currently in the phase-difference moving mode (NO in step S403), the processing flow proceeds to step S404 to perform processing for determining switching to an operation for moving the focusing lens 105 toward the phase-difference in-focus position.

In step S404, the camera/AF microcomputer 115 sets threshold values that can be used to determine whether the contrast has changed and whether the object distance has changed. In step S405, based on the contrast change, the camera/AF microcomputer 115 determines whether the object has changed. Furthermore, the camera/AF microcomputer 115 obtains a distance change based on a comparison between the object distance obtained in step S402 and a previously obtained object distance. More specifically, the camera/AF microcomputer 115 compares the contrast change and the object distance change with the threshold values set in step S404.

If the camera/AF microcomputer 115 determines that the contrast has changed and the object distance has changed (YES in step S405), the processing flow proceeds to step S406. However, if the conditions of step S405 are not satisfied (NO in step S405), the camera/AF microcomputer 115 executes the above-described TV-AF control operation. The processing of step S405 is primary processing for determining switching to an operation for moving the focusing lens 105 based on phase-difference information.

Although not described in detail, the camera/AF microcomputer 115 can determine the contrast change based on a maximum value of the difference between maximum and minimum values of the luminance signal level of each line in a predetermined AF gate obtained from the AF signal processing circuit 114.

In step S406, the camera/AF microcomputer 115 sets a focus lens moving amount threshold "th" which can be used to determine whether the focusing lens 105 can be moved based on the phase-difference in-focus position. The focus lens moving amount threshold "th" is set as a value variable depending on a zooming position.

For example, in a rear focusing lens system usable in a video camera described in the present exemplary embodiment, the difference in the in-focus position at each object distance changes according to a focal length. For example, at the same (1 m to infinite) object distance, the difference in the in-focus position becomes larger as the focal length is set at a telephoto side.

Accordingly, it is now assumed that the focus lens moving amount threshold is set considering the phase-difference in-focus accuracy at a telephoto side, so that information obtained based on the phase difference can be used to determine a change in the object distance. In this case, to obtain the same focus lens moving amount, if the same settings are used at a wide-angle side, determination that the object distance change is in the range of 1 m to infinite cannot be performed. Thus, the phase-difference AF operation does not work when the focal length is set to a wide-angle side.

In step S407, the camera/AF microcomputer 115 compares the phase-difference in-focus position obtained in step S402 with the present lens position and determines whether the position difference is greater than the focus lens moving amount threshold "th" set in step S406. If the lens position difference (i.e., focus lens moving amount) is greater than the threshold "th" (YES in step S407), the processing flow proceeds to step S408. On the other hand, if the focus lens moving amount is equal to or less than the threshold "th" (NO in step S407), the camera/AF microcomputer 115 continuously performs the TV-AF control.

In the present exemplary embodiment, the camera/AF microcomputer 115 does not promptly move the focusing lens 105 toward the phase-difference in-focus position based on the comparison result of the focus moving amount, because the phase-difference AF system is not so accurate compared to the TV-AF system. If the camera/AF microcomputer 115 immediately starts moving the focusing lens 105 to the phase-difference in-focus position, the undesirable hunting phenomenon may occur between the TV-AF control and other AF control. If the AF operation is performed inappropriately, a defocused video image may be generated.

In step S408, the camera/AF microcomputer 115 determines whether the direction of the phase-difference in-focus position relative to the present lens position is identical to a moving direction of the focusing lens 105 based on the TV-AF control operation. If these directions are the same (YES in step S408), the processing flow proceeds to step S409. In step S409, the camera/AF microcomputer 115 switches the operation mode to the phase-difference driving mode. Then, in step S410, the camera/AF microcomputer 115 causes the focusing motor 111 to move the focusing lens 105 to the phase-difference in-focus position. On the other hand, if the directions are different (NO in step S408), the camera/AF microcomputer 115 continuously performs the TV-AF control.

As described above, the processing of steps S407 and S408 is secondary processing for determining switching to an operation for moving the focusing lens 105 based on phase-difference information. The present exemplary embodiment can reduce any AF operation that may produce an unnecessary defocused video image when the focusing lens 105 is moved toward the phase-difference in-focus position, based on the comparison of a moving amount of the focusing lens 105 moving to the phase-difference in-focus position and the moving direction of the focusing lens 105 in the TV-AF control.

Figure 5:
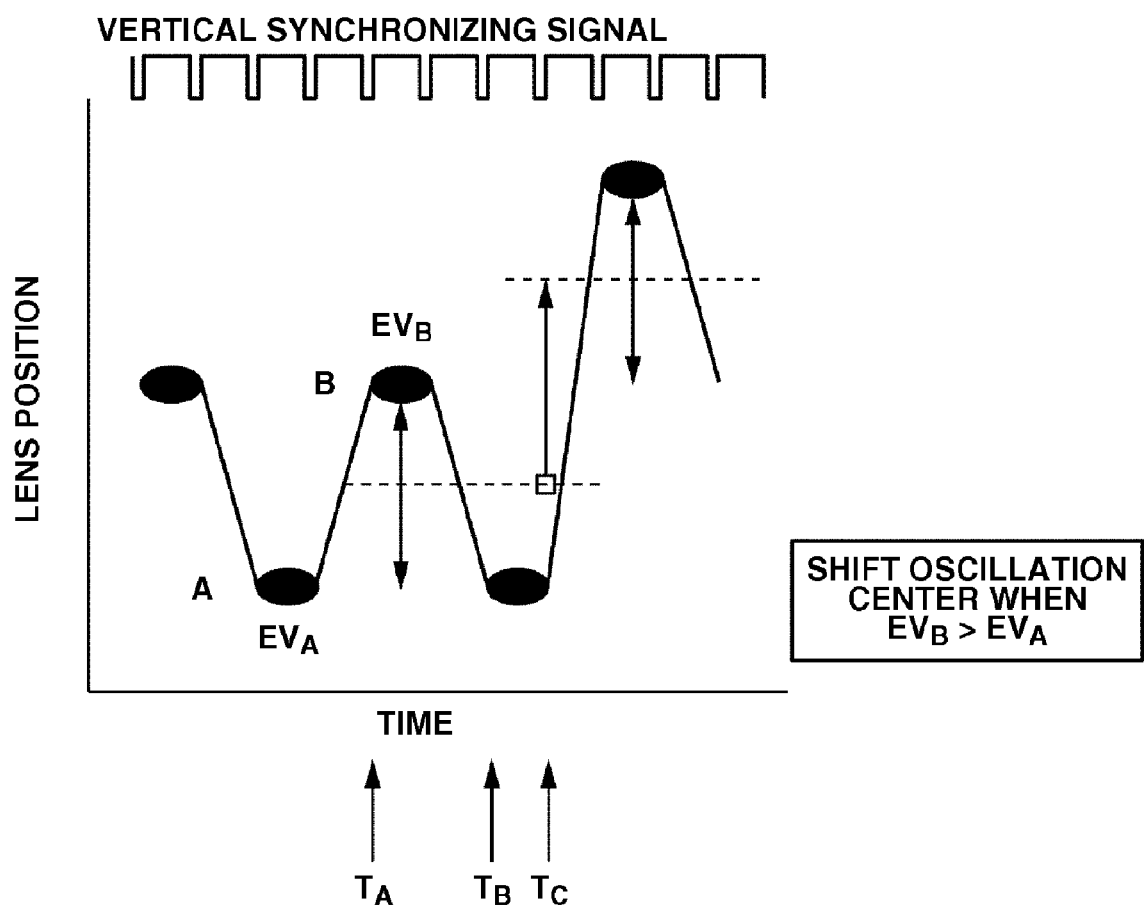
FIG. 5 illustrates an exemplary minute driving operation.

FIG. 5 illustrates an exemplary moving trail of the focusing lens 105 in the minute driving control. In FIG. 5, the abscissa axis represents time and the ordinate axis represents the position of the focusing lens 105. FIG. 5 illustrates a vertical synchronizing signal of the video signal together with the moving trail of the focusing lens 105.

According to the example illustrated in FIG. 5, the camera/AF microcomputer 115 obtains an AF evaluation value $EV_A$ corresponding to electric charge stored in a CCD during a period "A" at timing $T_A$ and obtains an AF evaluation value $EV_B$ corresponding to electric charge stored in the CCD during a period "B" at timing $T_B$. Then, at timing $T_C$, the camera/AF microcomputer 115 compares the AF evaluation values $EV_A$ and $EV_B$.

If the AF evaluation value $EV_B$ is greater than the AF evaluation value $EV_A$ ($EV_B>EV_A$), the camera/AF microcomputer 115 shifts the oscillation center (i.e., driving amplitude=oscillation amplitude+center moving amplitude). If the AF evaluation value $EV_A$ is greater than the AF evaluation value $EV_B$ ($EV_A>EV_B$), the camera/AF microcomputer 115 does not shift the oscillation center (i.e., driving amplitude=oscillation amplitude). In other words, the minute driving operation is the processing for searching for a lens position where the AF evaluation value is maximized during a moving operation of the focusing lens 105.

Figure 6:
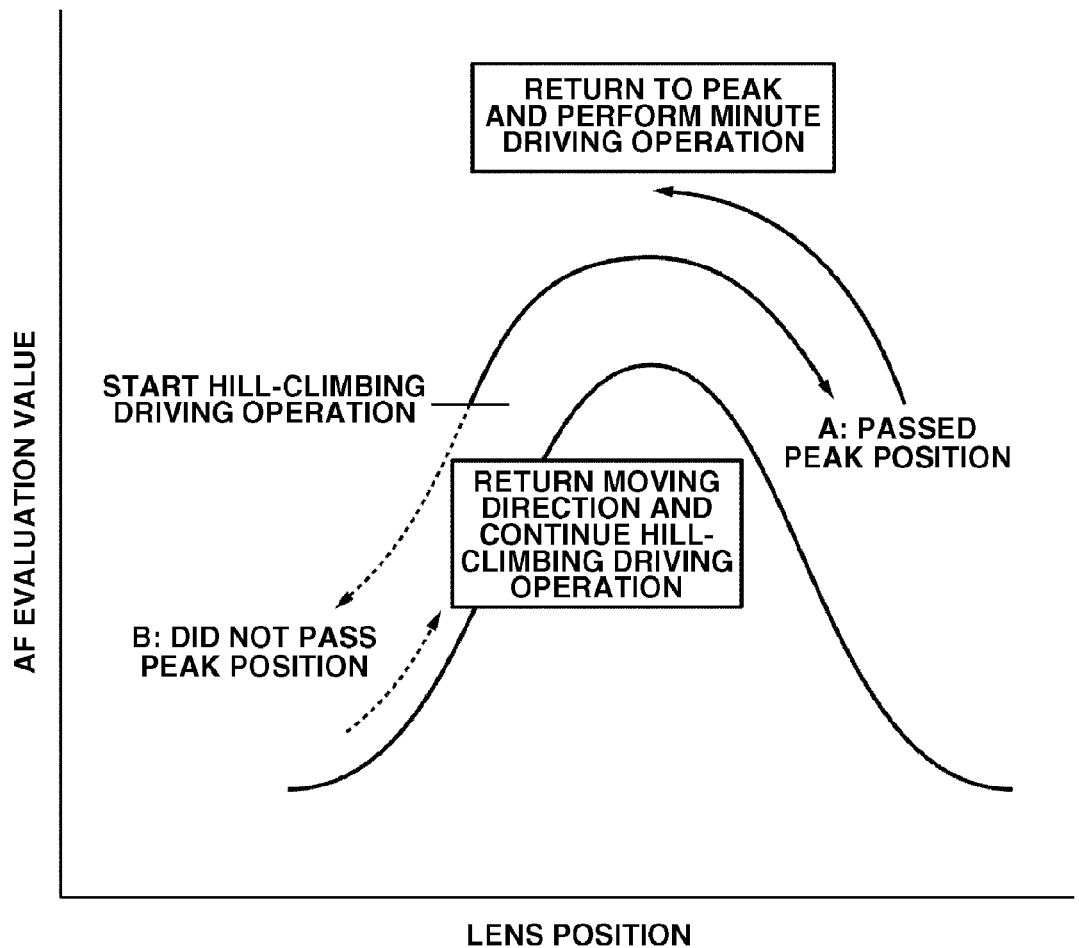
FIG. 6 illustrates an exemplary hill-climbing driving operation.

FIG. 6 illustrates an exemplary hill-climbing driving operation. The camera/AF microcomputer 115 searches for a peak point or its vicinity in the AF evaluation value while the camera/AF microcomputer 115 causes the focusing motor 111 to move the focusing lens 105 at a speed higher than a predetermined speed. According to the exemplary movement of the focusing lens 105 illustrated in FIG. 6, the movement "A" passes a peak point corresponding to an in-focus position during a hill-climbing driving operation. Therefore, the camera/AF microcomputer 115 terminates the hill-climbing driving operation and starts the minute driving operation. On the other hand, the exemplary movement "B" does not pass a peak point because the moving direction of the focusing lens 105 is wrong. Thus, the camera/AF microcomputer 115 reverses the moving direction of the focusing lens 105 and continues the hill-climbing driving operation.

Second Exemplary Embodiment

Figure 7:
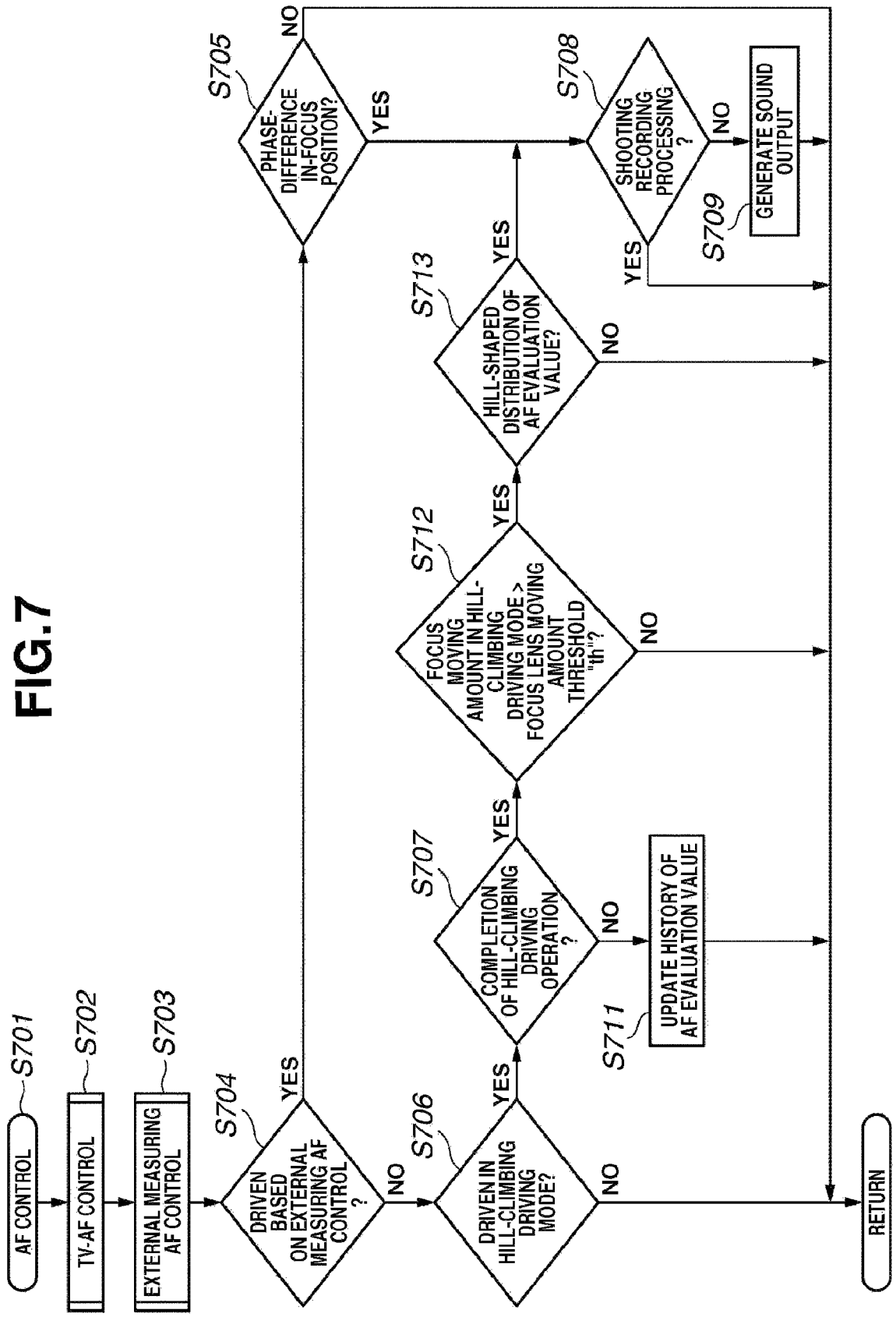
FIG. 7 is a flowchart illustrating an example operation of the video camera according to a second exemplary embodiment of the present invention.

FIG. 7 is a flowchart illustrating a hybrid AF control performed by the camera/AF microcomputer 115 according to a second exemplary embodiment of the present invention. In FIG. 7, if the two last digits of a step number is identical to those of the step number illustrated in FIG. 2, the processing of such a step (i.e., steps S701 to S709) is similar to the processing of the corresponding step (i.e., steps S201 to S209) described in the above-described first exemplary embodiment. Therefore, the description for such steps is duplicative and will not be repeated.

According to the above-described first exemplary embodiment, information indicating an in-focus state is provided to a user when the hill-climbing driving operation is completed in a focusing control operation based on the TV-AF system. However, if a panning operation is performed when a low-contrast object or an object having a lower AF evaluation value is captured, it is difficult, in the TV-AF control, to determine whether the captured image is in a defocused state to lower the AF evaluation value.

Therefore, even if the object is positioned at the same distance, the AF evaluation value may once decrease and the camera/AF microcomputer 115 may start the hill-climbing driving operation. In this case, the object distance remains unchanged and a change from an in-focus state to an in-focus state occurs. If information indicating an in-focus state is provided to a user, the user may feel a sense of incongruity.

Furthermore, at a telephoto side, an object may be captured in a defocused state if the object is positioned at a close distance smaller than the minimum object distance. In this case, the hunting phenomenon occurs repetitively. The switching to the hill-climbing driving operation is repeated. More specifically, if the focusing lens 105 reaches the end of a moving range before reaching a peak point of the AF evaluation value in the hill-climbing driving operation, the focusing lens 105 reverses the moving direction and the minute driving operation begins. Thus, the above-described phenomenon occurs.

Then, in response to a reduction in the AF evaluation value, the camera/AF microcomputer 115 starts the hill-climbing driving operation and repeats an operation for moving the focusing lens 105 to the end of the moving range. In this case, in a situation where a focus adjusting position is difficult, information indicating an in-focus state may be provided to a user at the timing the focusing lens 105 reverses the moving direction.

To eliminate these drawbacks, in step S711, the camera/AF microcomputer 115 constantly stores the history of the AF evaluation value and updates the stored value while the focusing lens 105 is moving based on the hill-climbing driving operation.

In step S712, although not described in detail, the camera/AF microcomputer 115 compares the focusing lens position stored in the beginning of the hill-climbing driving operation with the peak point obtained based on the hill-climbing driving operation at the timing the hill-climbing driving operation of step S707 is completed.

If the focus moving amount is equal to or less than a predetermined focus lens moving amount threshold "th" (NO in step S712), the camera/AF microcomputer 115 prevents the speaker 118 from generating a sound output. The predetermined focus lens moving amount threshold "th" in step S712 can be similar to the focus lens moving amount threshold "th" in step S406.

If the focus moving amount is greater than the predetermined focus lens moving amount threshold "th" (YES in step S712), then in step S713, the camera/AF microcomputer 115 refers to the history of the AF evaluation value stored in step S711 and determines whether the AF evaluation value has a hill-shaped distribution. If the AF evaluation value does not have a hill-shaped distribution (NO in step S713), the camera/AF microcomputer 115 prevents the speaker 118 from generating a sound output. If the AF evaluation value has a hill-shaped distribution (YES in step S713), the processing flow proceeds to step S708.

Third Exemplary Embodiment

Figure 8:
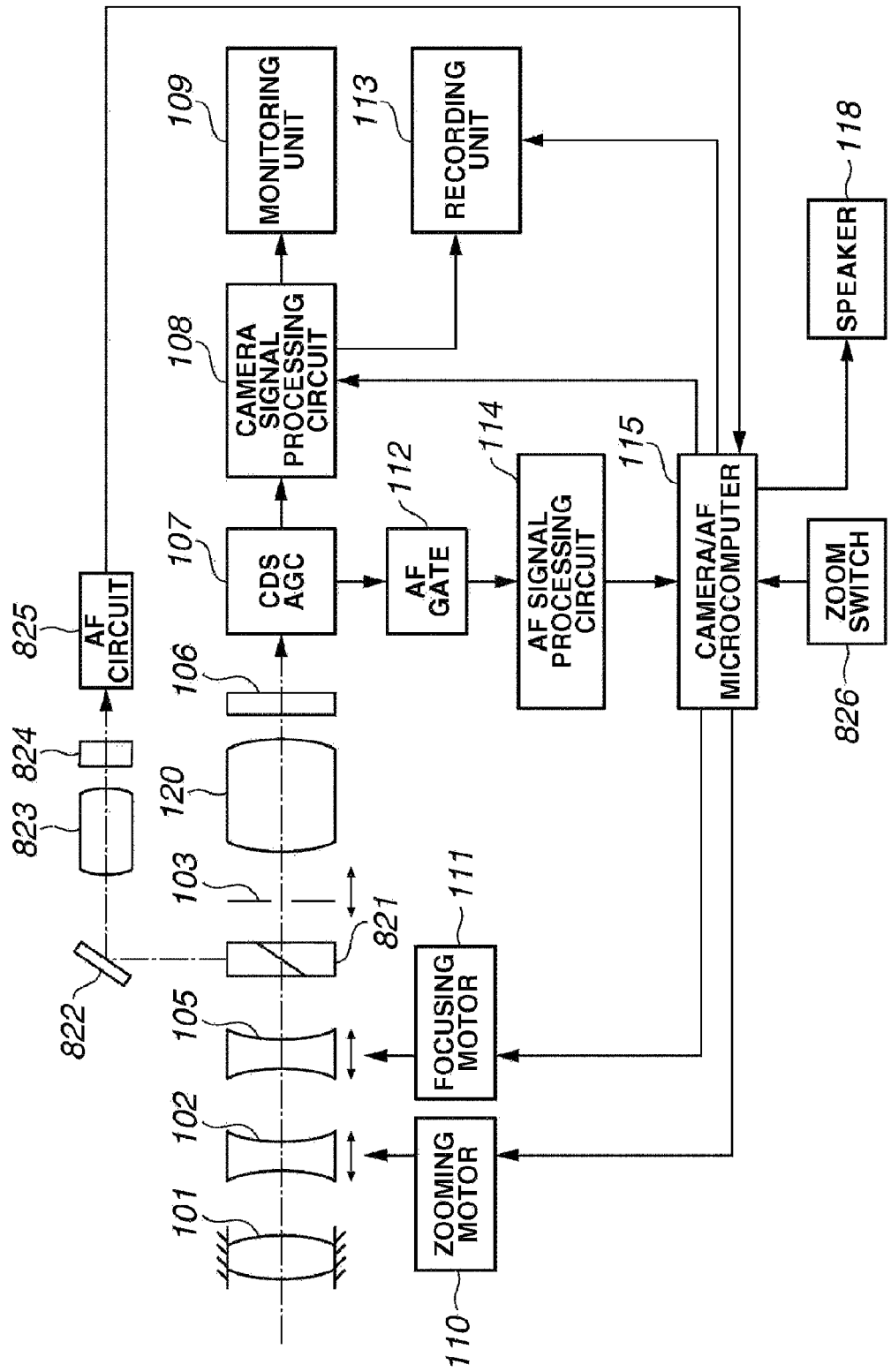
FIG. 8 is a block diagram illustrating an example video camera according to a third exemplary embodiment of the present invention.

FIG. 8 is a block diagram illustrating an imaging apparatus according to a third exemplary embodiment. In the present exemplary embodiment, constituent components similar to those described in the above-described first and second exemplary embodiments are denoted by the same reference numerals, and thus will not be described again. Unlike the first exemplary embodiment, which uses the external range-finding unit 116, the third exemplary embodiment uses a Through-The-Lens (TTL) phase-difference detection system (i.e., an internal measuring phase-difference detection system).

The imaging apparatus illustrated in FIG. 8 includes an image-forming lens unit 120 disposed between an iris 103 and an image sensor 106. It should be noted that, while each lens unit is shown as it is formed of a single lens, each lens unit may actually be formed of a single lens or a plurality of lenses. The imaging apparatus illustrated in FIG. 8 also includes a half prism 821 configured to split incident light into beams one of which can be used for the AF control, a sub mirror 822, an image-forming lens 823 for the AF control, an AF sensor 824 based on the phase-difference detection system, an AF circuit 825, and a zoom switch 826.

The camera/AF microcomputer 115 detects a deviation amount and a deviation direction based on an output from the AF sensor 824 via the AF circuit 825. The half prism 821 splits incident light before the light reaches the iris 103 because the iris 103 is working as an optical element for capturing a moving image.

In the third exemplary embodiment, the camera/AF microcomputer 115 obtains a deviation amount and a deviation direction of a focusing state in step S404 (FIG. 4) based on the internal measuring phase-difference detection system, instead of using the external range-finding system. Thus, the third exemplary embodiment can use the AF control algorithm described in the first exemplary embodiment.

More specifically, in step S404, the camera/AF microcomputer 115 obtains the deviation amount and the deviation direction of the focusing state. In step S405, the camera/AF microcomputer 115 determines whether the object distance has changed based on the deviation amount of the focusing state. In step S407, the camera/AF microcomputer 115 calculates a phase-difference in-focus position based on the deviation amount and the deviation direction of the focusing state, and compares the calculated in-focus position with the present lens position. In step S408, the camera/AF microcomputer 115 determines whether the deviation direction of the focusing state is identical to the moving direction based on the TV-AF control.

Other Exemplary Embodiments

As described above, according to the above-described exemplary embodiments, an imaging apparatus having a hybrid AF function can speedily and accurately perform a focusing operation. When an in-focus position is detected based on the phase-difference AF operation, and when the focusing lens is moved to a position where the AF evaluation value is maximized in the hill-climbing driving operation based on the TV-AF system, information indicating an in-focus state can be provided to a user.

The above-described exemplary embodiments provide the in-focus state information as a sound output or a visual output. Thus, a user can easily know the focusing state of the focusing lens without feeling any delay in the focusing operation.

Furthermore, the above-described exemplary embodiments enable a video camera to easily perform an in-focus determination in a moving image shooting mode in the same manner as in the still image shooting mode responsive to a half depression of the shutter button. Thus, a user can easily recognize the degree of an in-focus state.

In the above-described exemplary embodiments, an imaging apparatus having an imaging optical system (e.g., a zooming lens or a focusing lens) can serve as an example of the optical apparatus. However, the present invention can be applied to other optical apparatus such as a telescope or a microscope.

According to the above-described exemplary embodiments, the video camera generates a sound output after the focusing lens has reached an in-focus position based on the hill-climbing driving operation or the external AF control operation. However, it is also useful that the video camera generates a sound output immediately before the focusing lens reaches an in-focus position. Moreover, before the focusing lens reaches an in-focus position based on the minute driving operation, the video camera can generate a sound output when a predetermined time has elapsed after the focusing lens has almost reached the in-focus position based on the hill-climbing driving operation or the external AF control operation.

Software program code for realizing the flowcharts of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-205673 filed Jul. 28, 2006, which is hereby incorporated by reference herein in its entirety.

What is claimed is:

1. An optical apparatus comprising:
a control unit configured to perform an operation for moving a focusing lens at a first speed to detect a first position corresponding to an in-focus state and then moving the focusing lens at a second speed lower than the first speed in forward and backward directions across the first position to detect a second position corresponding to an in-focus state; and
an output unit configured to output information indicating an in-focus state of the focusing lens recognizable by a user,
wherein the output unit outputs the information in response to the control unit detecting the first position.

2. The optical apparatus according to claim 1, further comprising an in-focus position detection unit configured to output a phase-difference signal representing a focusing state of the focusing lens and to detect an in-focus position of the focusing lens based on the phase-difference signal, wherein after the in-focus position is detected by the in-focus position detection unit, the control unit moves the focusing lens at the first speed and then moves the focusing lens at the second speed.

3. The optical apparatus according to claim 1, wherein the output unit does not output the information if a difference between a start position of the focusing lens moving at the first speed and the first position is less than a predetermined value.

4. The optical apparatus according to claim 1, wherein the output unit includes at least one of a sound output unit configured to generate a sound output indicating an in-focus state of the focusing lens recognizable by a user or a display output unit configured to display information indicating an in-focus state of the focusing lens recognizable by a user on an image screen.

5. The optical apparatus according to claim 1, wherein the first speed includes a speed in a quick focusing control for moving the focusing lens at a high speed, and the second speed includes a speed in a fine focusing control for moving the focusing lens at a speed lower than the first speed.

6. The optical apparatus according to claim 1, wherein the output unit outputs the information when a moving image is captured.

7. The optical apparatus according to claim 6, wherein the output unit includes a sound output unit configured to generate a sound output indicating an in-focus state of the focusing lens recognizable by a user, and wherein the sound output unit generates no sound output during recording of the captured moving image.

8. An optical apparatus comprising:

a control unit configured to perform an operation for moving a focusing lens at a first speed and then moving the focusing lens at a second speed lower than the first speed in forward and backward directions to detect an in-focus position; and an output unit configured to output information indicating an in-focus state of the focusing lens recognizable by a user, wherein the output unit outputs the information in response to the control unit switching from moving of the focusing lens at the first speed to moving of the focusing lens at the second speed before detecting the in-focus position.

9. An imaging apparatus comprising:

an imaging unit configured to output an image based on object light; and an optical apparatus including, a control unit configured to perform an operation for moving a focusing lens at a first speed to detect a first position corresponding to an in-focus state and then moving the focusing lens at a second speed lower than the first speed in forward and backward directions across the first position to detect a second position corresponding to an in-focus state; and an output unit configured to output information indicating an in-focus state of the focusing lens recognizable by a user, wherein the output unit outputs the information in response to the control unit detecting the first position.

10. A method for controlling an optical apparatus, the method comprising:

performing an operation for moving a focusing lens at a first speed to detect a first position corresponding to an in-focus state and then moving the focusing lens at a second speed lower than the first speed in forward and backward directions across the first position to detect a second position corresponding to an in-focus state; and outputting information indicating an in-focus state of the focusing lens recognizable by a user in response to detecting the first position.

11. A method for controlling an optical apparatus, the method comprising:

performing an operation for moving a focusing lens at a first speed and then moving the focusing lens at a second speed lower than the first speed in forward and backward directions to detect an in-focus position; and outputting information indicating an in-focus state of the focusing lens recognizable by a user in response to switching from moving of the focusing lens at the first speed to moving of the focusing lens at the second speed before detecting the in-focus position.

* * * * *